US006993659B2

(12) United States Patent
Milgramm et al.

(10) Patent No.: US 6,993,659 B2
(45) Date of Patent: Jan. 31, 2006

(54) INDEPENDENT BIOMETRIC IDENTIFICATION SYSTEM

(75) Inventors: Michael Milgramm, Valley Steam, NY (US); Viatcheslav Stroutchkov, Brooklyn, NY (US)

(73) Assignee: Info Data, Inc., New York, NY (US)

( * ) Notice: Subject to any disclaimer, the term of this patent is extended or adjusted under 35 U.S.C. 154(b) by 582 days.

(21) Appl. No.: 10/128,860

(22) Filed: Apr. 23, 2002

(65) Prior Publication Data
US 2003/0200257 A1    Oct. 23, 2003

(51) Int. Cl.
*G06F 17/00* (2006.01)
(52) U.S. Cl. .................. 713/186; 709/202; 709/203; 382/115; 340/5.52; 340/5.53; 719/317
(58) Field of Classification Search ........ 382/115–127; 713/186, 200–202; 719/317; 709/200–203; 340/5.53, 5.52
See application file for complete search history.

(56) References Cited

U.S. PATENT DOCUMENTS

| 6,505,193 | B1 * | 1/2003 | Musgrave et al. ............. 707/3 |
| 2002/0070844 | A1 * | 6/2002 | Davida et al. ............. 340/5.53 |
| 2002/0112177 | A1 * | 8/2002 | Voltmer et al. ............. 713/200 |
| 2002/0129285 | A1 * | 9/2002 | Kuwata et al. ............. 713/202 |
| 2003/0120934 | A1 * | 6/2003 | Ortiz ......................... 713/186 |
| 2003/0179229 | A1 * | 9/2003 | Van Erlach et al. ........ 345/744 |
| 2003/0208684 | A1 * | 11/2003 | Camacho et al. .......... 713/186 |
| 2003/0212709 | A1 * | 11/2003 | De Schrijver ........... 707/104.1 |
| 2004/0133804 | A1 * | 7/2004 | Smith et al. ................ 713/201 |

\* cited by examiner

*Primary Examiner*—St. John Courtenay, III

(57) ABSTRACT

An independent biometric identification system has an independent biometric identification server, a biometric administrator agent application, a biometric capture agent application, a biometric enrolling agent application, and a biometric database. The independent biometric identification server provides a biometric identification independently of individual applications implemented on a user's system. The biometric administrator agent, biometric capture agent, and biometric enrolling agent applications are clients of the independent biometric identification server.

28 Claims, 4 Drawing Sheets

INDEPENDENT BIOMETRIC IDENTIFICATION SYSTEM

FIELD OF THE INVENTION

The present invention generally relates to a system for biometric identification.

BACKGROUND OF THE INVENTION

Biometric identification systems are becoming increasingly popular. However, these systems may be difficult to implement. A system developer of a biometric identification system needs to resolve several auxiliary problems seemingly unrelated to the biometric system itself. As shown in the comparative example of FIG. 1, a developer will have to add several steps to the typical process of computer identification to enable this process to identify a user by his/her biometric characteristics, when a biometric identification device (Capture Device) is added to the system.

As shown in FIG. 1, a conventional biometric identification system has a Client BSP and Server BSP components, which are typically provided by a Biometric Service Provider. The Client BSP component receives biometric data from a biometric Capture Device, for example a fingerprint scanner. The Server BSP component performs the algorithm of verification of the received biometric data using earlier created and stored templates. To add a biometric identification aspect to a typical system, for example a computer network, developers will have to first assess individual characteristics of the Capture Device. These devices are manufactured by different companies and, therefore, often require an individual Program Interface to be added to the system to enable exchange of information between the system and the device. Next, a Client Application program has to be developed, which will deliver the biometric data in a convenient format, accept the biometric data from the Capture Device and convey this data to the server side. On the server side, a Server Application has to be developed to accept the biometric information, transform it into a server-readable format and, then convey the information to a server-side Program Interface, which will also need to be developed. The server-side Program Interface enables a data exchange between the Server Application and the Server BSP. In addition to this complicated process of conveying and verifying biometric data, the developer will have to address the problem of providing security of this transferred data at every step of the process.

In addition to the above drawbacks of a conventional biometric identification system, the developer will have provide means for enrolling new users to the system and calculate sufficiency of a BSP-associated database of biometric information. However, the most important drawback of the above described system is that the system will have to be redesigned if a different biometric Capture Device is added to the system. Therefore, there is a need I the industry for a biometric security system, which is independent of an individual capture device and is capable of being implemented without developing additional interfacing means.

SUMMARY OF THE INVENTION

It is an object of the present invention to provide a biometric identification system independent of individual capture devices.

It is another object of the present invention to provide a biometric identification system independent of individual verification algorithms implemented by various biometric service providers.

It is a further object of the present invention to provide biometric identification from different Biometric Service Providers (BSP).

It is still another object of the present invention to provide a biometric identification system, which ensures a secure communication.

It is still another object of the present invention to provide a biometric identification system, which keeps register of identification activities.

It is still another object of the present invention to provide a biometric identification system, which provides statistical reports.

As shown in FIG. 2, The provided independent biometric identification system functions as a server in a client-server model. The biometric capture agent, biometric enrolling agent, and the biometric administrator agent are the clients of the independent biometric identification server. These agents are signed by appropriate digital certificates to prevent imitation and to secure their access to a capture device connected to the user's system. In the preferred embodiment, the independent biometric identification server supports plain socket protocol and HTTP to communicate with its clients. It is preferably an assigned administrator's responsibility to choose an appropriate protocol or protocols to fit to the given security requirements.

In accordance with the present invention, when a client accesses a Web Application Server, the system connects client's system with a first page, which includes a Biometric Capture Agent signed with an appropriate digital certificate. The Biometric Capture Agent is a software component that is downloaded and run on client's computer to provide a identification service. The Biometric Capture Agent acts on behalf of an application calling for identification service. The independent biometric identification server manages identification over the Biometric Capture Agent. The Biometric Capture Agent manages a biometric capture device, receives a biometric data from the capture device and sends the data to the independent biometric identification server. The independent server processes the data and creates a special access token, which is sent to the Web Application Server over the Biometric Capture Agent. Having gotten the access token the application inquires the independent biometric identification server about information associated with this token, i.e., the user's information. The independent biometric identification server sends back user's information together with an IP address of the user's web-accessing device (e.g., user's computer) and the time of successful identification procedure. Based on that information an application makes a decision as to whether to grant an access to the user. An individual Biometric Capture Agent is developed for each kind of scanner equipment. The independent server chooses an appropriate Biometric Capture Agent using information from the provided database of available scanners.

The above and other objects, aspects, features and advantages of the invention will be more readily apparent from the description of the preferred embodiments thereof taken in conjunction with the accompanying drawings and appended claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE PREFERRED EMBODIMENT AND THE DRAWINGS

The present invention is described in connection with an independent biometric identification system INDSS™, which has been developed by Info Data, Inc. and is currently used in connection with several biometric identification applications. INDSS™ is a standalone application. In accordance with the present invention, the independent biometric security system does not keep its identification software on a client's computer, instead it is downloaded from the server at the moment of identification.

Figure 1:
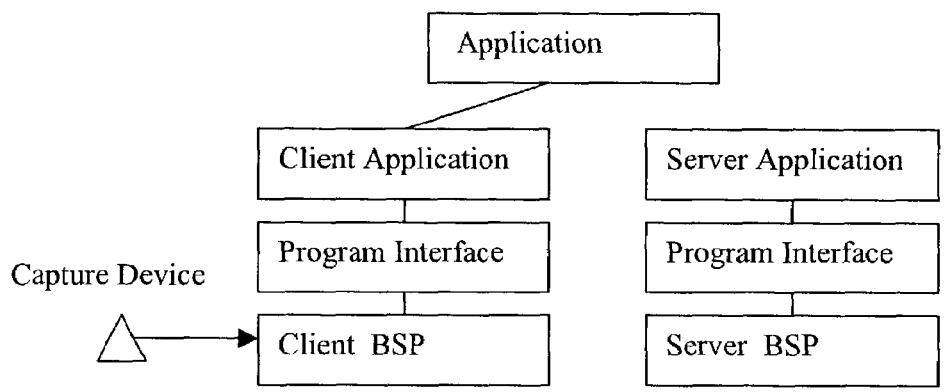
FIG. 1 is a schematic diagram illustrating a conventional biometric identification system.
Figure 2:
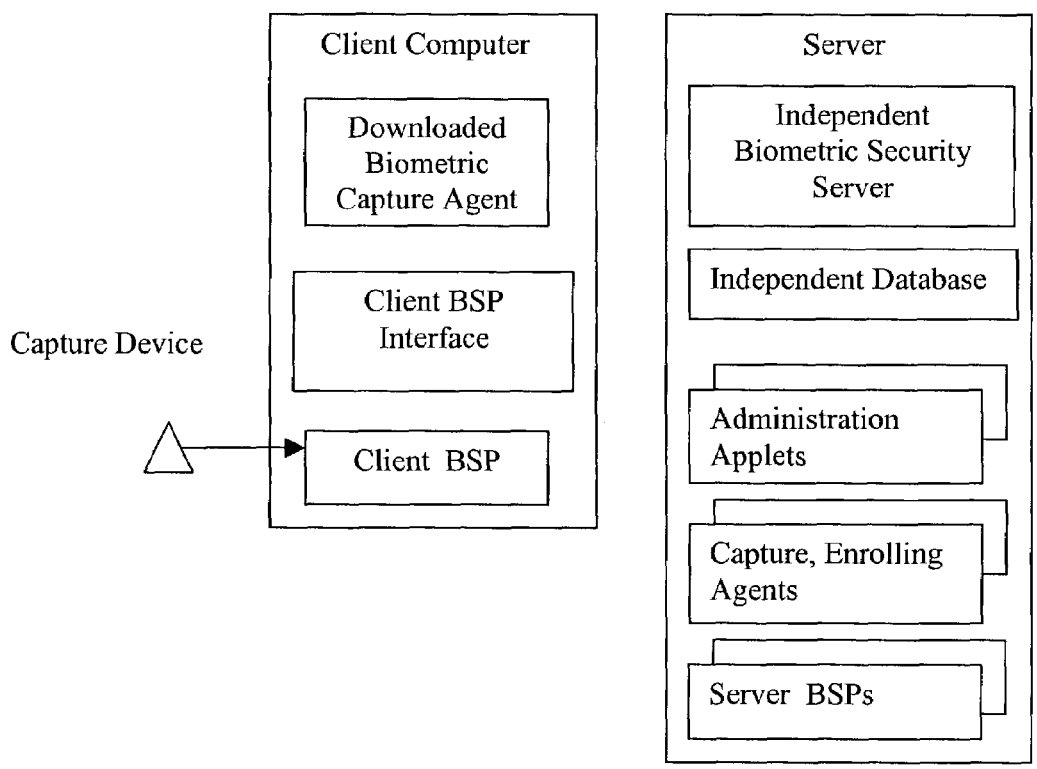
FIG. 2 is a schematic diagram illustrating a biometric identification system in accordance with the present invention.
Figure 3:
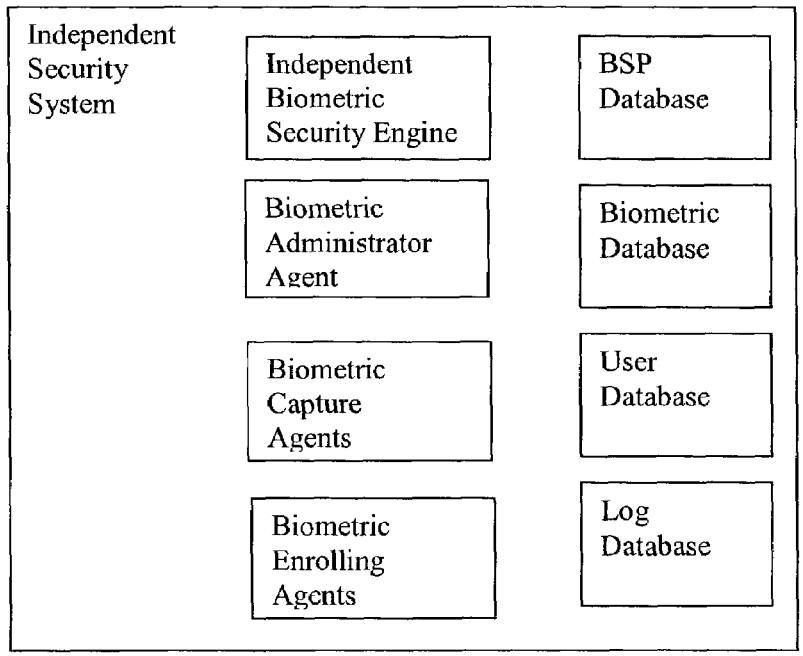
FIG. 3 is a schematic diagram showing a structure of the biometric identification system in accordance with the present invention.

As shown in FIG. 3, the provided independent biometric identification system functions as a server in a client-server model. The biometric capture agent, the biometric enrolling agent, and the biometric administrator agent are the clients of the independent biometric identification server. These agents are signed by appropriate digital certificates to prevent imitation and enable their access to a capture device connected to the user's system. As a result of such digital signing, the server always knows that it communicates with an agent it has just sent to the client's computer. There are currently no effective ways to imitate behavior of the provided software agents. In the preferred embodiment, the independent biometric identification server supports plain socket protocol and HTTP to communicate with its clients. It is preferably an assigned administrator's responsibility to choose an appropriate protocol or protocols to fit to the given security requirements.

Figure 4:
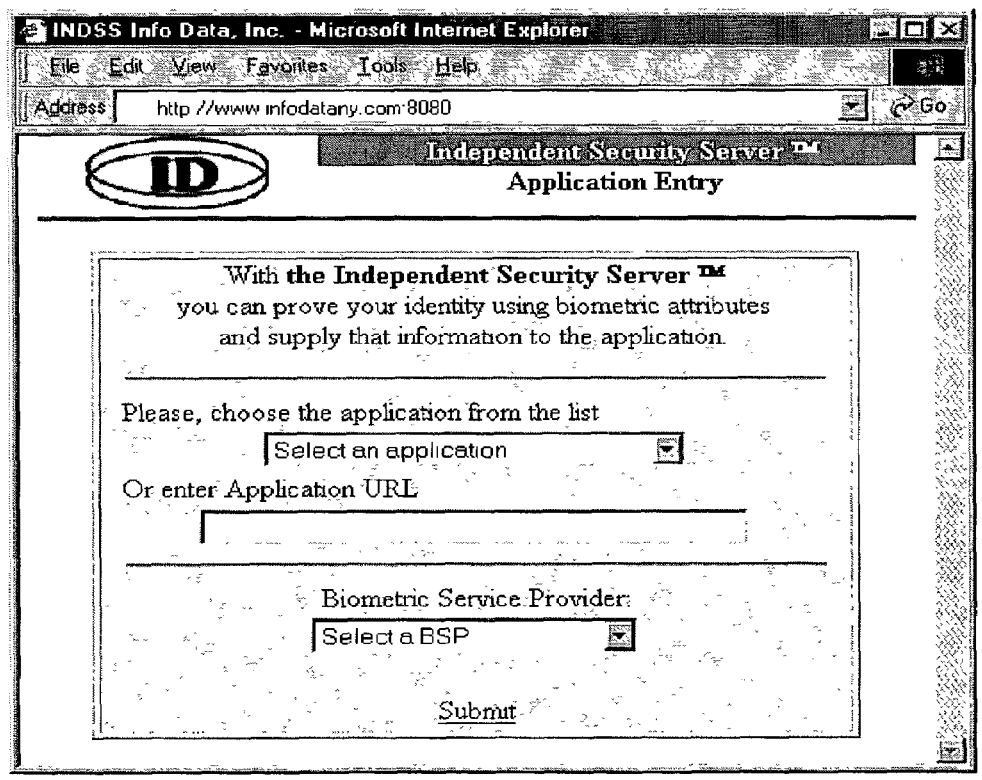
FIG. 4 is a screen shot of a web-page of the provided system allowing a client to select its biometric service provider and an application the client wants to run to verify his/her identity.
Figure 6:
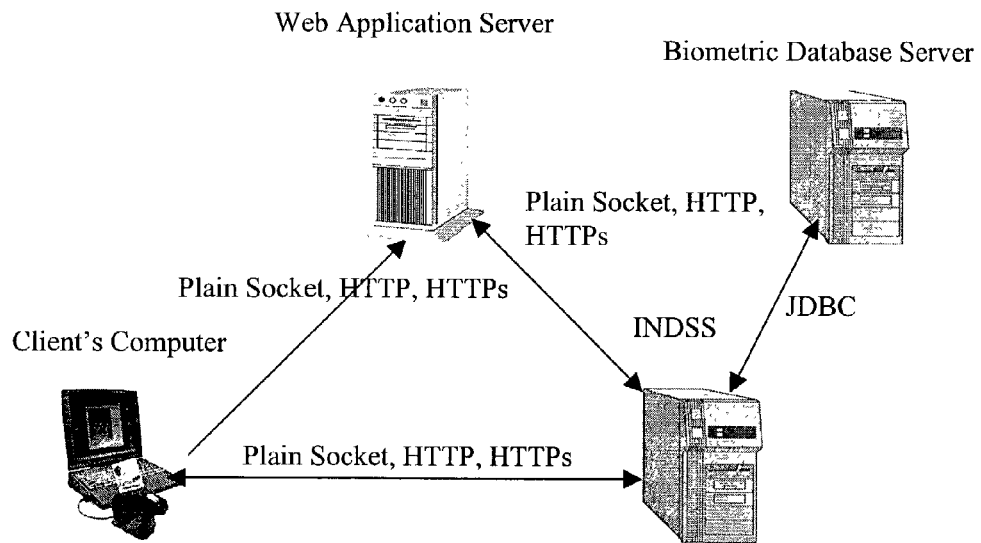
FIG. 6 is a schematic diagram showing the flow of information in the provided biometric identification system.

In the preferred embodiment shown in FIG. 6, when a client accesses a Web Application Server, the system connects client's system with a first page, shown in FIG. 4, where the client can select a Biometric Service Provider and enter URL of application (or choose from the list of registered applications) the client wants to run to verify his/her identity. The first page is connected to a download mechanism for a Biometric Capture Agent signed with an appropriate digital certificate. The Biometric Capture Agent is a software component that is downloaded and runs on the client's computer to provide a identification service. The Biometric Capture Agent acts on behalf of an application calling for identification service. The independent biometric identification server manages identification over the Biometric Capture Agent. The Biometric Capture Agent manages a biometric capture device, receives a biometric data from the capture device and sends the data to the independent biometric identification server. The independent server processes the data and creates a special access token, which is sent to the Web Application Server over the Biometric Capture Agent. Having gotten the access token the application inquires the independent biometric identification server about information associated with this token, i.e., the user's information. The independent biometric identification server sends back user's information together with an IP address of the user's web-accessing device (e.g., user's computer) and the time of successful identification procedure. Based on that information an application makes a decision as to whether to grant an access to the user. An individual Biometric Capture Agent is developed for each kind of scanner equipment. The independent server chooses an appropriate Biometric Capture Agent using information from the provided database of available scanners.

Please note that although in the preferred embodiment the Web Application Server, the independent biometric identification server, and the biometric database server are described as separate units, they can be implemented on the same server.

The structure of the independent biometric identification system provided in accordance with the present invention is shown in FIG. 3. In the preferred embodiment the system includes the independent biometric security engine (i.e., the server), the biometric administrator applet, biometric enrolling agent, and biometric capture agents described above.

The independent biometric security engine provides secure communication with a client's computer and manages all other components of the system. The independent biometric security engine is a standalone server application. It implements server identification and data encryption over SSL protocols. The independent server chooses an optimal way to perform identification according to individual security policies of various clients. The server keeps track of its activities and provides statistical reports to a system's administrator.

The system's administrator is a privileged user having a special privilege to create new root in hierarchy and has an associated administrator object within in the user's database that is created during an installation process. The administrator also has a record in the biometric database.

The biometric administrator applet is a software component, which can be used by the system's administrator to manage the independent biometric identification system. The biometric administrator applet is digitally signed with an appropriate private key to prevent an imitation. It allows the system's administrator to, inspect a list of successful user registrations using a date value and an IP address of user's computer; inspect a list of registered users; delete user's record; edit a user's record; enroll a new user; reenroll a user; inspect a list of registrations for a specified user; revise a fingerprint or another biometric template; and get statistical information.

As described above, one biometric capture agent is created for each type of biometric identification technology (fingerprint, face, voice, handwriting, etc.). A capture agent relies on an interface with a biometric service provider according to the known BioAPI Specification. In case if the biometric service provider does not implement BioAPI Specification, a special client interface may be developed.

To perform identification, an appropriate i-biometric capture agent is sent to a client's system requesting the identification. The biometric capture agent obtains biometric information from client's BSP and sends it to the independent biometric identification system using a secure protocol. The independent biometric security engine provides the identification using server components appropriate for the client's BSP. The result is digitally signed with the appropriate private key and is sent to the capture agent. The capture agent itself is digitally signed with the private key to prevent imitation.

In accordance with the present invention, biometric information of individual users is stored in the provided biometric database. The biometric database is created by the independent biometric security system as a result of enrolling operation and is used during identification process. The biometric database is independent from other databases of the system. It is preferably open to add new type of biometric information and recognition algorithms. The biometric database may contain following types of information: raw fingerprint images, fingerprint templates for each recognition algorithm, iris image templates, voice templates, and other types of biometric data.

In accordance with the preferred embodiment, the independent biometric identification system further includes a database of Biometric Service Providers (BSPs). The BSP database preferably contains the following information about each BSP registered with the independent biometric verification system: BSP Client Components, BSP Client-Independent Server Interface, BSP Server Components, and BSP Server-Independent Server Interface. That information and an appropriate biometric agents are the only components an administrator will need to add a new BSP to the independent biometric identification system. BSP Client Components and BSP Client Interface will be downloaded and installed on a client's system. The biometric database contains templates for each BSP the user was enrolled with. Each record has two key fields, i.e., the user-ID and the BSP name, and a template field. The template field depends on a specific BSP.

Individual users may self enroll into the biometric database using a biometric enrolling agent. Because the provided security system is independent of individual identification applications used by the client's computer, only one entry of user's biometric information is required for use with any identification and verification application when the application is utilized for the same type of biometric data, i.e., fingerprint, voice, etc. The biometric enrolling agent is a software component that is downloaded and runs on a client's computer to enable a self-enrolling procedure for a user. The self-enrolling procedure is preferably conducted under control of the administrator. The administrator creates an employee object, assigns a login name and password and permits one-time self-enrolling. The administrator can set additional limitations on self-enrolling like duration of permission and IP address of a computer from which the self-enrolling procedure is permitted. The biometric enrolling agent is developed for each kind of scanner equipment. The independent server chooses an appropriate biometric enrolling agent using information from its database of scanning equipment providers.

The independent biometric identification system further includes a user database, which preferably contains personal user data. The structure of the users' data will depend on additional services the independent biometric identification system will provide to application and can be developed separately. To provide only identification service the user database has to contain some form of a user-ID. The record in the user database should be created before enrolling.

The system is also provided with a log database, where the system keeps track of all its activities. The log database is used to provide an administrator with statistical information.

Although the above databases were described as separate database units, they may be implemented as different aspects of one database. However, the biometric database should always be preserved as an independent component of the system.

Following is a process of user identification using the independent biometric identification system in accordance with the present invention. When the user is directed to the system, he/she has to select an application and Biometric Service Provider his/her computer system is equipped with, as shown in FIG. 4. For a registered application the independent biometric verification system knows a URL address where the verification application resides. Alternatively, a URL field may be provided on the screen shown in FIG. 4 to allow the user to enter the URL address of the application which accomplishes a biometric identification service.

Figure 5:
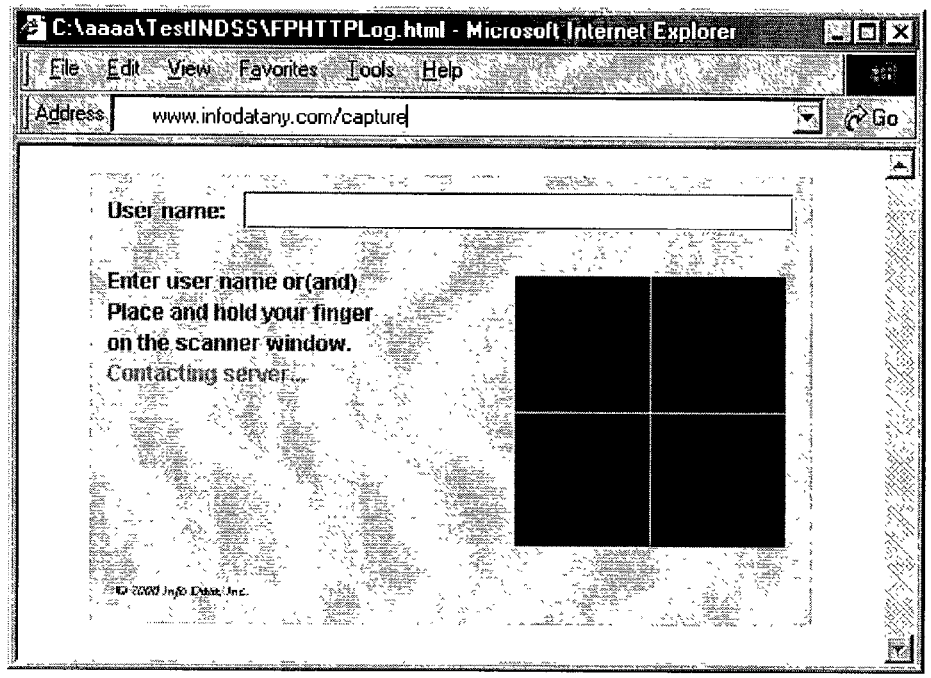
FIG. 5 is a screen shot of a capture page of the provided system.

Having gotten the above information, the independent biometric identification system sends an appropriate capture agent, as shown in FIG. 5. The capture agent provides a user interface with the identification system during the identification process. If the identification is successful, a special access token (i.e., a temporary access code) is created by the system and the application is activated with the token as argument. Having gotten the token the application sends a query to the independent biometric identification system to obtain full information about the identification result. The information includes user personal information (Name, Personal Identification Number, etc.) and additional parameters (time of identification, user's IP address, etc.).

Figure 7:
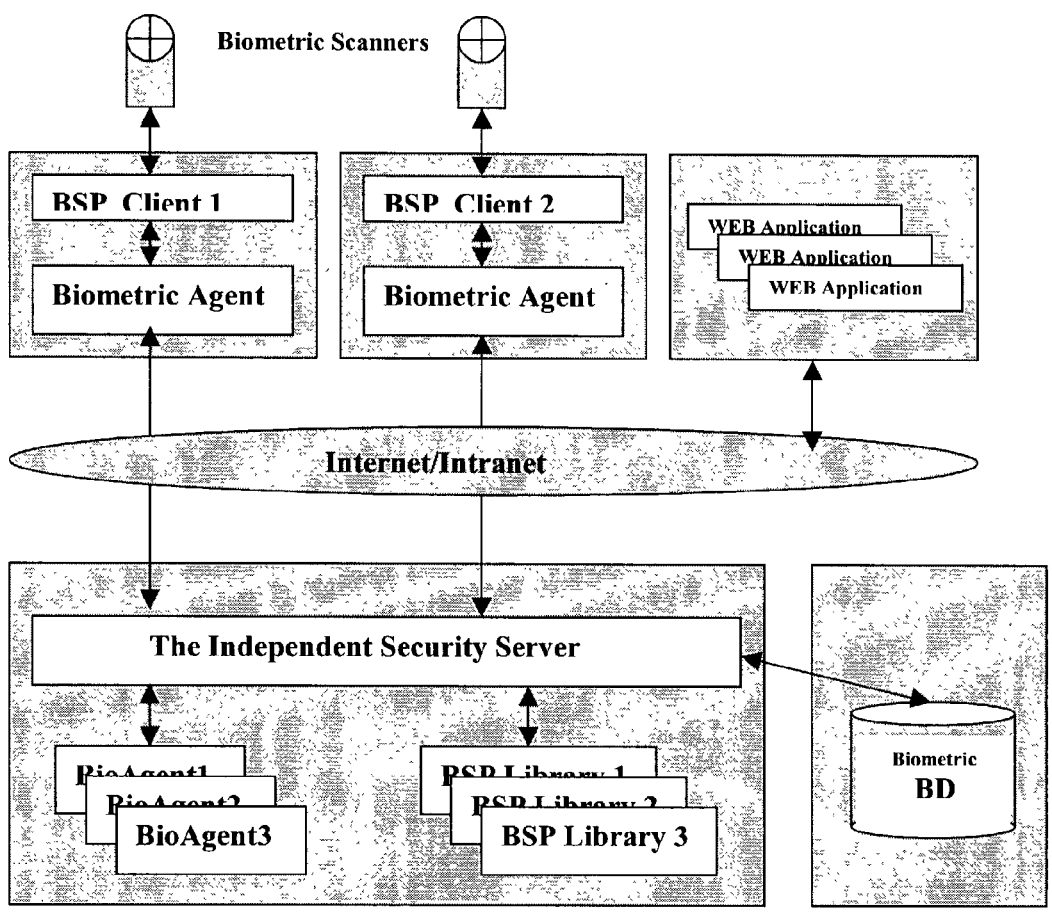
FIG. 7 is a schematic diagram showing the work of the independent biometric security system in a multiple client environment.

As shown in FIG. 7, work of the provided independent biometric security system in a multiple client environment is a composite of the above described single-client identification process. The independent security server provides biometric identification service, integrates algorithms from different Biometric Service Providers, provides support for different biometric scanning devices and is available for any web application. Similarly, to a single-client system, the only one user entry is needed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim as follows:

1. An independent biometric identification system comprising:
   an independent biometric identification server, said server providing a biometric identification independently of individual applications implemented on a user's system;
   a biometric administrator agent application;
   a biometric enrolling agent application;
   a biometric capture agent application; and
   a biometric database;
wherein said biometric administrator agent application and said biometric enrolling agent application and said biometric capture agent application are clients of said independent biometric identification server.

2. The independent biometric identification system according to claim 1 further comprising a capture device connected to a user's system, said capture device being configured to receive biometric characteristics of said user and convey said biometric characteristics to said biometric capture agent application.

3. The independent biometric identification system according to claim 2, wherein said biometric characteristics comprise a human fingerprint.

4. The independent biometric identification system according to claim 2, wherein said biometric characteristics comprise a human facial feature.

5. The independent biometric identification system according to claim 2, wherein said biometric characteristics comprise a human iris feature.

6. The independent biometric identification system according to claim 2, wherein said biometric characteristics comprise a human retina feature.

7. The independent biometric identification system according to claim 2, wherein said biometric characteristics comprise a human hand feature.

8. The independent biometric identification system according to claim 2, wherein said biometric characteristics comprise a human voice.

9. The independent biometric identification system according to claim 2, wherein said biometric characteristics comprise a human writing style.

10. The independent biometric identification system according to claim 1 further comprising a biometric service provider database.

11. The independent biometric identification system according to claim 1 further comprising a user database.

12. The independent biometric identification system according to claim 1, wherein said biometric database is an independent component of a combined database implemented on said biometric identification system.

13. The independent biometric identification system according to claim 12, wherein said combined database comprises a user database.

14. The independent biometric identification system according to claim 12, wherein said combined database comprises a log database.

15. The independent biometric identification system according to claim 12, wherein said combined database comprises a biometric service provider database.

16. The independent biometric identification system according to claim 1, wherein said biometric administrator agent application is digitally signed with an appropriate private key to prevent an imitation.

17. The independent biometric identification system according to claim 1, wherein said biometric capture agent application is digitally signed with an appropriate private key to prevent an imitation.

18. The independent biometric identification system according to claim 1, wherein said biometric enrolling agent application is digitally signed with an appropriate private key to prevent an imitation.

19. A method of independent biometric identification comprising the steps of:
   selecting a capture agent;
   connecting a user's system to an independent biometric identification server using said selected capture agent;
   obtaining a user's biometric characteristics using a capture device said capture device being affiliated with a particular biometric application;
   conveying said obtained biometric characteristics to the independent biometric identification server using the capture agent; and
   using said selected capture agent to compare said conveyed biometric characteristics to templates stored in a database,
   wherein said capture agent is selected from a group of available capture agents such that said selected capture agent is configured in accordance with said particular biometric application affiliated with said capture device.

20. The method of independent biometric identification according to claim 19 further comprising the step of conveying results of said comparing step to a biometric service provider.

21. The method of independent biometric identification according to claim 19 further comprising the step of managing the independent biometric identification server using a biometric administration agent.

22. The method of independent biometric identification according to claim 19, wherein said biometric characteristics comprise a human fingerprint.

23. The method of independent biometric identification according to claim 19, wherein said biometric characteristics comprise a human iris feature.

24. The method of independent biometric identification according to claim 19, wherein said biometric characteristics comprise a human retina feature.

25. The method of independent biometric identification according to claim 19, wherein said biometric characteristics comprise a hand feature.

26. The method of independent biometric identification according to claim 19, wherein said biometric characteristics comprise a human facial feature.

27. The method of independent biometric identification according to claim 19, wherein said biometric characteristics comprise a human voice.

28. The method of independent biometric identification according to claim 19, wherein said biometric characteristics comprise a human writing style.

* * * * *